(12) United States Patent
Yan et al.

(10) Patent No.: US 10,848,051 B2
(45) Date of Patent: Nov. 24, 2020

(54) SYNCHRONIZING HICCUP OVER-CURRENT PROTECTION OF MULTIPHASE SWITCHING CONVERTERS

(71) Applicant: Analog Devices International Unlimited Company, Limerick (IE)

(72) Inventors: Yingyi Yan, Fremont, CA (US); Qian Li, Milpitas, CA (US); Yi Ding Gu, Pleasanton, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 15/795,197

(22) Filed: Oct. 26, 2017

(65) Prior Publication Data

US 2019/0131866 A1    May 2, 2019

(51) Int. Cl.
  *H02M 1/32*    (2007.01)
  *H02M 1/088*   (2006.01)
  *H02M 3/158*   (2006.01)
  *H02M 3/156*   (2006.01)

(52) U.S. Cl.
  CPC .............. *H02M 1/32* (2013.01); *H02M 3/156* (2013.01); *H02M 3/1584* (2013.01)

(58) Field of Classification Search
  CPC ...... H02M 1/32; H02M 3/33507; H02M 1/36; H02M 2001/0032; H02M 3/33523; H02M 1/08; H02M 2001/0067; H02M 2001/0074; H02M 2001/0077; H02M 3/156

See application file for complete search history.

(56) References Cited

U.S. PATENT DOCUMENTS

| 4,928,200 | A  | 5/1990  | Redl et al.      |
|-----------|----|---------|------------------|
| 6,411,483 | B1 | 6/2002  | Sarles et al.    |
| 6,548,992 | B1 | 4/2003  | Alcantar et al.  |
| 6,631,064 | B2 | 10/2003 | Schuellein et al.|
| 6,680,837 | B1 | 1/2004  | Buxton           |
| 7,113,379 | B2 | 9/2006  | Matsumoto        |
| 7,116,563 | B2 | 10/2006 | Hua              |
| 7,254,000 | B1 | 8/2007  | Smith et al.     |
| 7,592,788 | B2 | 9/2009  | Bartolo et al.   |
| 7,616,422 | B2 | 11/2009 | Lee et al.       |
| 7,706,151 | B2 | 4/2010  | Neidorff et al.  |
| 8,576,584 | B2 | 11/2013 | Hosotani         |
| 8,693,218 | B2 | 4/2014  | Chueh et al.     |

(Continued)

FOREIGN PATENT DOCUMENTS

CN    109713644 A    5/2019

*Primary Examiner* — Gustavo A Rosario-Benitez
(74) *Attorney, Agent, or Firm* — Schwegman Lundberg & Woessner, P.A.

(57) ABSTRACT

A multiphase switching converter includes a first switching converter circuit including a power stage coupled to a DC voltage supply and a controller. The controller includes an over-current (OC) circuit that can detect an OC event and, upon detecting the OC event, set a command signal to a preset low value and provide a first hiccup signal. A synchronization circuit can generate a second hiccup signal based on the command signal of the OC circuit satisfying a first reference threshold value, and a sampled portion of an output voltage of the power stage satisfying a second reference threshold value. A hiccup timer can be triggered by one of the first hiccup signal or the second hiccup signal to start a hiccup pulse in response to being triggered.

20 Claims, 8 Drawing Sheets

(56) References Cited

U.S. PATENT DOCUMENTS

| | | | |
|---|---|---|---|
| 8,879,217 B2 | 11/2014 | Tang et al. | |
| 9,263,876 B2 | 2/2016 | Jiang et al. | |
| 9,385,617 B2 * | 7/2016 | Hosotani | H02M 1/32 |
| 9,478,977 B2 | 10/2016 | Li et al. | |
| 9,496,780 B2 | 11/2016 | Warnes | |
| 9,748,761 B2 | 8/2017 | Ohwaki | |
| 2003/0048648 A1 * | 3/2003 | Lin | H02M 3/1584 |
| | | | 363/65 |
| 2003/0128485 A1 * | 7/2003 | Matsumoto | H02H 3/06 |
| | | | 361/18 |
| 2007/0291516 A1 * | 12/2007 | Nakamura | H02M 1/32 |
| | | | 363/21.01 |
| 2008/0122420 A1 * | 5/2008 | Zhou | H02M 3/335 |
| | | | 323/285 |
| 2009/0097284 A1 * | 4/2009 | Takei | H02M 3/33507 |
| | | | 363/56.1 |
| 2011/0211282 A1 * | 9/2011 | Nanov | H02M 1/32 |
| | | | 361/18 |
| 2012/0056604 A1 * | 3/2012 | Song | H02M 1/4225 |
| | | | 323/207 |
| 2013/0043850 A1 * | 2/2013 | Zhu | H02M 3/156 |
| | | | 323/271 |
| 2016/0087542 A1 * | 3/2016 | Warnes | H02M 1/32 |
| | | | 363/21.05 |
| 2016/0181814 A1 * | 6/2016 | Huang | G06F 1/263 |
| | | | 307/24 |
| 2017/0163026 A1 | 6/2017 | Yang et al. | |

* cited by examiner

SYNCHRONIZING HICCUP OVER-CURRENT PROTECTION OF MULTIPHASE SWITCHING CONVERTERS

FIELD OF THE DISCLOSURE

The present description relates generally to integrated circuits, and more particularly, to synchronizing hiccup over-current protection of multiphase switching converters.

BACKGROUND

More and more high current loads are emerging in the industrial applications such as automotive and telecom applications. In this regard, multi-phase switching power converters are gaining popularity in providing the high current for these applications. In the multiphase approach, the focus of the design can be directed to optimization of a single phase design, including the power stage and control and/or protection scheme. Each phase can run stand alone, or can be paralleled as a high current converter.

One example is a power module, in which the converter unit has been optimized and modularized, such that the end user can benefit from the modularity and easily scale the power supply in a short time with the fully verified building blocks. This reduces the time-to-market. Another benefit of a multiphase configuration is redundancy. For example, in case a phase of a multiphase converter fails, the next phase can seamlessly take over without interrupting the output.

When the output of a power converter is loaded beyond its preset current limit, a controller should take action to protect the load. One robust solution is hiccup mode protection. After the controller detects an overcurrent condition, it immediately clamps the current sharing signal and limits its output current. If the overcurrent fault exists for longer than a predetermined time, the converter turns off for a preset long period of time and retry to start-up after the time period expires. In the high current applications, the hiccup protection strategy is preferable since it can minimize the heat dissipation at the load. It is challenging, however, to adopt the hiccup mode protection for multiphase converters. Unless their power stages and control loops are perfectly identical, different phases of a multiphase converter may detect the overcurrent condition at different level, and at different times. This can cause disorder of hiccup times sequencing. It might also cause the converter latch-up in a wrong state.

In a current-mode controlled dual phase high-voltage boost converter for automotive application, for example, the current-mode controlled dual phase converter shares a threshold current (ITH) signal between phases. When the overcurrent occurs, once the shared current command ITH is clamped by one controller with slightly lower threshold, the other one will not detect the overcurrent event and keep running at full power. Some converters add a dedicated communication bus to perform the detection, however, the additional bus not only requires extra cost and complication, but can also lower the overall reliability of the converters.

SUMMARY OF THE DISCLOSURE

In one or more aspects, a multiphase switching converter includes a first switching converter circuit including a power stage coupled to a DC voltage supply and a controller. The controller includes an over-current (OC) circuit that can detect an OC event and, upon detecting the OC event, set a command signal to a preset low value and provide a first hiccup signal. A synchronization circuit can generate a second hiccup signal based on the command signal of the OC circuit satisfying a first reference threshold value, and a sampled portion of an output voltage of the power stage satisfying a second reference threshold value. A hiccup timer can be triggered by one of the first hiccup signal or the second hiccup signal to start a hiccup pulse in response to being triggered.

In one or more embodiments, a method for synchronizing hiccup over-current protection in a multiphase switching converter includes detecting, by an over-current circuit, an over-current event. The method further includes, in response to detecting the over-current event, setting, by the over-current circuit, a command signal to a preset low value and providing a first signal. A second signal is generated, by a synch circuit, in response to command signal being lower than a first reference threshold value and a sampled portion of a regulated output voltage of the multiphase switching converter is less than a second reference threshold value. A hiccup mechanism can be triggered based on one of the first signal or the second signal. The over-current circuit and the synch circuit are modules of a control circuit included in each switching converter of the multiphase switching converter.

In yet one or more other embodiments, a converter system with synchronized hiccup overcurrent protection includes two or more switching converter to operate using multiphase sequential switching pulses. Each of the two or more switching converter modules includes a power stage coupled to a DC voltage source and a control circuit, and the control circuit includes an over-current circuit and a synch circuit. Each over-current circuit of the switching converter modules can detect an over-current event and, upon detecting the over-current event, can set a command signal to a preset low value and to provide a first signal, Each respective synch circuit of the switching converter modules includes a hiccup timer and can generate a second signal in response to the command signal being lower than a first reference threshold value and the regulated output voltage being less than a second reference threshold value. The hiccup timer can be started by one of the first signal or the second signal.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

In one or more aspects of the subject technology, methods and configurations are described for synchronizing hiccup over-current protection of multiphase switching converters. The subject technology provides a robust hiccup protection scheme, regardless of the current sharing performance, the matching of overcurrent limit between controllers, phase number and controller number, closed loop control bandwidth and the load condition. Once one of the switching converter circuits or modules (also referred to as "phases") detects an overcurrent event, all phases are turned off simultaneously and the load is cooled down until a preset timer expires. The power dissipation during this period is approximately zero. After the hiccup timer expires, all the phases restart together. The disclosed scheme provides a multi-controller to multi-controller duplex communication, without adding a dedicated communication bus. As no dedicated communication bus is used, the cost is reduced and the implementation is simplified. The subject technology can be implemented in a variety of architectures of multiphase converters such as current-mode, voltage mode, and masterless and master-slave architectures, as described in more detail herein.

Figures 1A, 1B, 1C:
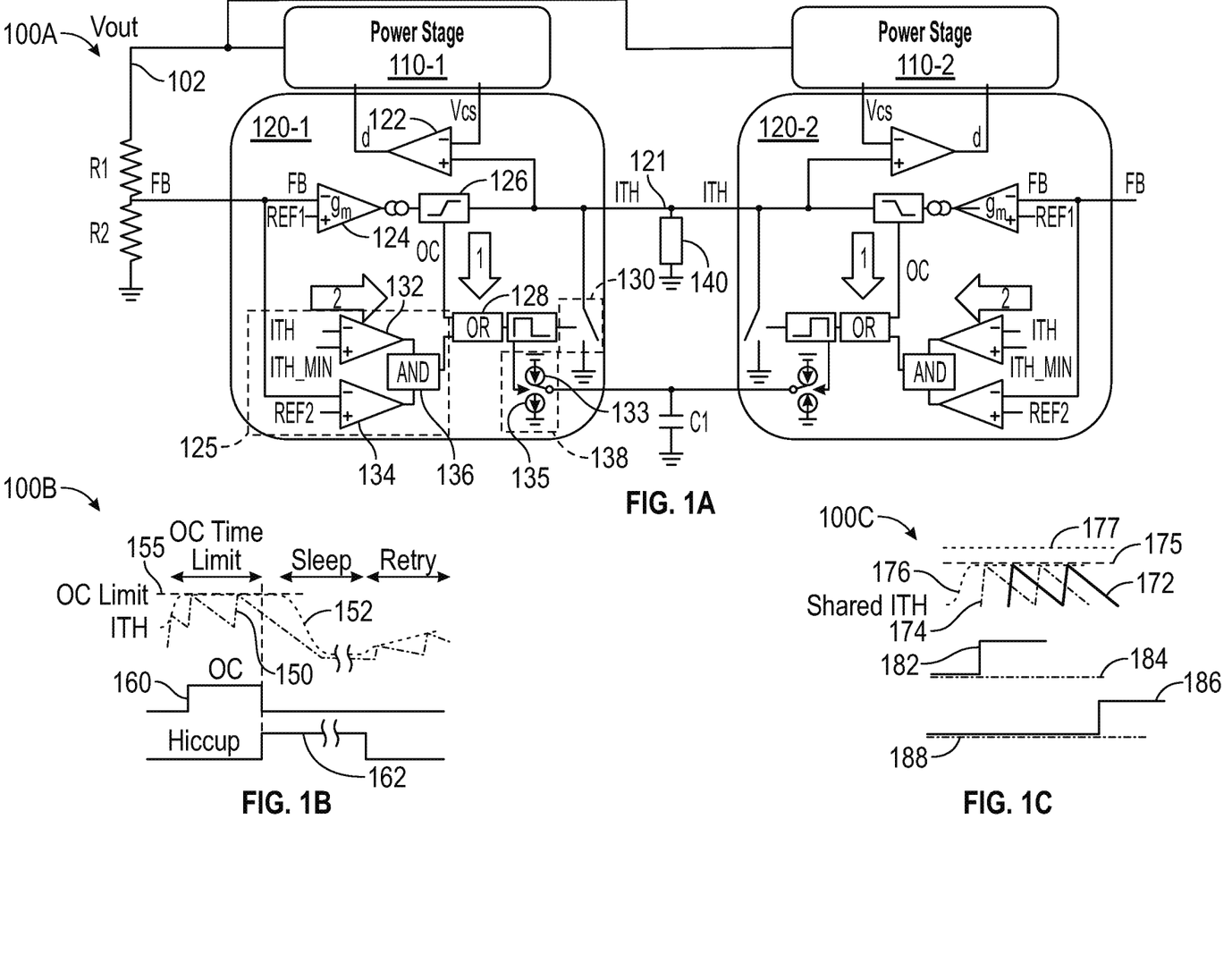
FIGS. 1A, 1B and 1C are a schematic diagram and timing diagrams illustrating an example synchronized two-phase switching converter and examples of overcurrent and hiccup pulse waveforms, according to aspects of the subject technology.

FIGS. 1A, 1B and 1C are a schematic diagram and timing diagrams illustrating an example synchronized two-phase switching converter 100A and examples of overcurrent and hiccup pulse waveforms, according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The synchronized two-phase switching converter 100A of FIG. 1 is a masterless hiccup over-current protection with cycle-by-cycle current limit switching converter, in which the two phases are similar and share a threshold current (ITH) signal. The synchronized two-phase switching converter 100A includes a first phase including a power stage 110-1 and a control circuit (also referred to as "controller") 120-1 and a second phase including a power stage 110-2 and a control circuit 120-2. The power stages 110-1 and 110-2 are similar and are coupled to a supply voltage (e.g., an unregulated supply voltage ($V_{DC}$)) and provide a regulated output voltage (Vout) at an output node 102 of the synchronized two-phase switching converter 100A. The power stages 110-1 and 110-2 are known stages and may use one or more switches and a number of other elements such as an inductor (or a transformer) or a capacitor and a diode to provide the regulated output voltage.

The control circuits 120-1 and 120-2 can trigger a hiccup mechanism as discussed below and are substantially similar in structure and functionality. In other words, the control circuits 120-1 and 120-2 have similar modules with similar functionalities. For brevity, only the control circuit 120-1 is described herein. The control circuit 120-1 includes a number of modules including a comparator 122, an error amplifier 124, an over current (OC) circuit 126, and a synchronization (synch) circuit 125. The error amplifier 124 can be a transconductance amplifier and compares a feedback (FB) voltage, sampled from the regulated output voltage Vout at a voltage divider formed of resistors R1 and R2, with a reference voltage (REF1) and generates an output current that is proportional to the deviation of the sampled voltage from the reference voltage. The OC circuit 126 is an OC protection circuit that can detect an overcurrent and upon detection of the overcurrent, can generate an OC signal, which as described below, is a first hiccup trigger signal and can trigger the hiccup mechanism if the overcurrent event continued for a preset length of time. The output current of the OC circuit 126 is a threshold current signal (ITH) that is used as a current command signal and is shared between the control circuits 120-1 and 120-2 at a node 121 that is coupled via a compensation circuit 140 (e.g., an RC circuit) to the ground potential. The OC circuit 126 can, at the same time, limit a maximum threshold current signal ITH to restrict this current to a preset OC value and prevent the load from being damaged.

The comparator 122 compares a current sensing signal ($V_{CS}$) with the shared current signal ITH to generate a duty cycle pulse (d) and provides the duty cycle signal to the power stage 110-1. The duty cycle pulse (d) can control a duty cycle of the power stage 110. The current sensing signal from the power stage 110-1 reflects the instantaneous waveform or the average value of an inductor current, an active switch current or a free-wheeling switch current of the power stage 110-1. The power stage 110-1 may include a modulator (e.g., a constant-frequency or variable frequency modulator) that can modulate the duty cycle pulse. The duty cycle pulse (d) can control a duty cycle of the power stage 110-1.

The synch circuit 125 of the subject disclosure can also be used to trigger the hiccup mechanism. The synch circuit 125 includes a first comparator 132, a second comparator 134, a logic AND gate 136, and a hiccup timer 138. The first comparator 132 compares the shared current signal ITH with a minimum value (e.g., ITH_MIN), and the second comparator 134 compares the FB voltage with the reference voltage REF2 (e.g., FB_MIN). The results of the comparisons by the first and second comparators 132 and 134 are fed to the AND gate 136, which generates a second hiccup trigger signal. Based on operational principles of the first and second comparators 132 and 134 and the AND gate 136, it is understood that the second hiccup trigger signal is generated (e.g., asserted) when the shared current signal ITH is smaller than a minimum value (ITH_MIN) and the FB voltage is lower than a reference voltage (REF2, e.g., FB_MIN), The first trigger signal (e.g., the OC signal) and the second trigger signal (e.g., the output signal from the AND gate 136) are sent to a logic OR gate 128.

The output of the logic OR gate 128 is logic high when at least one of the first or the second trigger signal are asserted. The logic high output of the logic OR gate 128 can close a switch 130 that pulls down the shared current signal to a low value (e.g., less than ITH_MIN) and at the same time start the hiccup timer 138. Pulling down the shared current signal ITH to the low value can cause the other controller circuit (120-2) to also start its hiccup timer regardless of detecting overcurrent or not. This may be referred to as a communication between phases without having a dedicated communication bus. The hiccup timer 138 includes a first current source 133 and a second current source 135. The first current source 133 is connected to a supply voltage and provides a charging current for the capacitor C1. The second current source 135 is connected to a ground potential and provides a constant discharge current for the capacitor C1, when the hiccup timer 138 is enabled. The discharge time of the capacitor C1 is a preset time that is based on a capacitance value of the capacitor C1 and a current value of the second current source, and determines the hiccup duration, discussed with respect to the overcurrent and hiccup pulses below.

The timing diagram 100B of FIG. 1B depicts example waveforms 150, 152, 160 and 162 of various currents and OC and hiccup pulses. The waveform 150 shows time variation of the sensed current (e.g., an inductor current of the power stage 110-1). The waveform 152 shows the shared current signal ITH as a function of time for a single phase switching converter. The shared current signal ITH is limited to the OC Limit 155 by the OC circuit 126, as discussed above. After the overcurrent continues for a preset time (e.g., OC time limit), the shared current signal ITH is pulled down by the switch 130 and the overcurrent returns to zero, as shown by the waveform 160. At the end of the OC time limit, the synch circuit 125 starts the hiccup timer 138. The hiccup pulse shown by the waveform 162 can continue for a predetermined time, during which the switching converter is sleep. After the predetermined time (e.g., a few seconds), the switching converter wakes up and the process repeats as needed.

The timing diagram 100C of FIG. 1C depicts example waveforms 172, 174, 176, 182, 184, 186 and 188 associated with a multiphase switching converter having, for example, a two-phase switching converter circuit. The waveforms 172 and 174 show time variations of the sensed currents of the two-phase switching converter circuit. The waveform 176 shows the shared current signal ITH as a function of time for the two-phase. In a multiphase switching converter, when the overcurrent occurs, the shared current signal ITH is clamped by the first controller with slightly lower threshold (e.g. 175), the second controller may not detect the overcurrent event due to a higher threshold 177 and may keep running at full power. Therefore, without the overcurrent protection scheme of the subject technology, the overcurrent pulses for the first and second controller are as shown by the waveforms 182 and 184. As a result, the first controller starts the hiccup pulse depicted by the waveform 186, whereas the second controller does not start the hiccup as shown by the waveform 188 and continues to run at full power.

The controller circuits of the subject technology (e.g. 120-1 and 120-2) allow multiple phases (e.g., 2 or more) of a multiple phase converter to be synchronized such that if the overcurrent was not detected by one or more phases, the phase that has first detected the overcurrent can pull down the shared threshold current ITH so that all phases start their respective hiccup timers.

Figure 2:
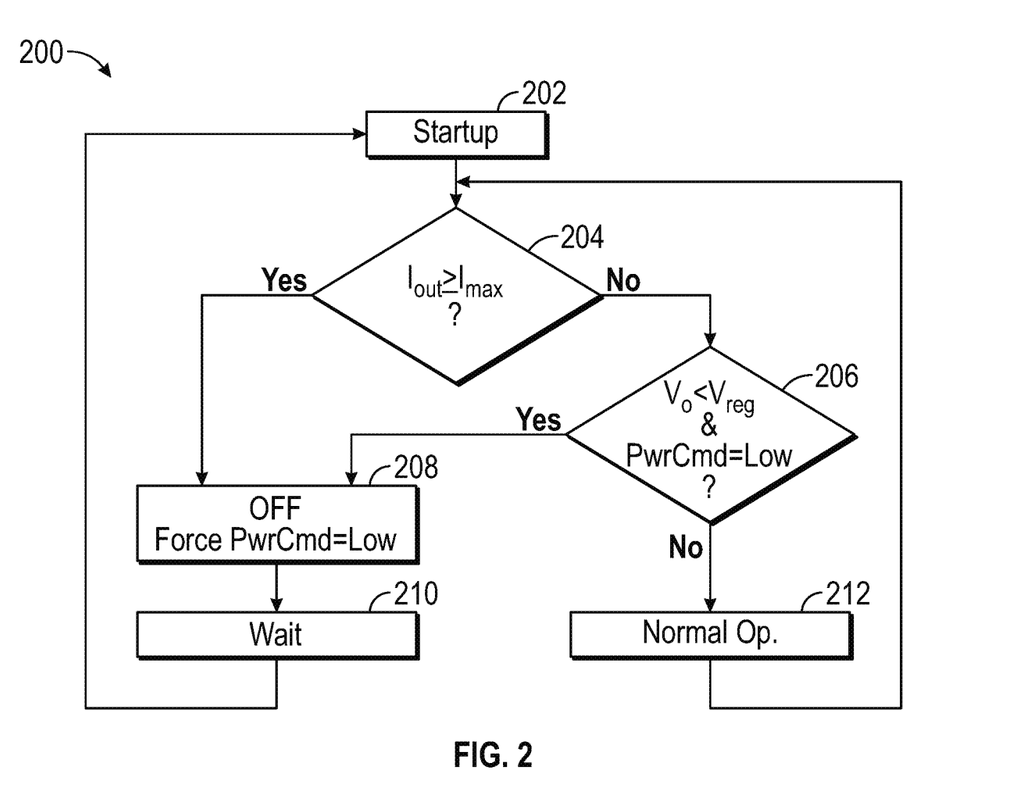
FIG. 2 is a flow diagram illustrating an example process for synchronizing hiccup over-current protection of a multiphase switching converter, according to aspects of the subject technology.

FIG. 2 is a flow diagram illustrating an example process 200 for synchronizing hiccup over-current protection of a multiphase switching converter, according to aspects of the subject technology. As discussed above, a multiphase switching converter without the scheme of the subject technology can fall into a situation that only one of the phases start the hiccup mechanism and other ones continue running at full power. Implementation of the process 200 allows the synchronized multiphase switching converter of the subject technology to mitigate this problem.

The process 200 begins at an operation block 202, where the synchronized multiphase switching converter (e.g., 100A of FIG. 1A) is at startup mode. At a control operation block 204, once the converter circuit starts up, the controller circuit (e.g., 120-1 of FIG. 1) keeps monitoring the output current $I_{out}$ to check if $I_{out}$ is higher than the maximum allowed (e.g., $I_{max}$). If $I_{out}$ is larger than $I_{max}$, the control is passed to an operation block 208. Otherwise, if the answer is no, at a control operation block 206, two conditions are checked. First, it is checked whether the output voltage ($V_O$) is smaller than a predetermined regulation value ($V_{reg}$) and second, it is determined whether the power command (PwrCmd) is low. The power command can be, for example, the shared current signal ITH of FIG. 1A. If one of these conditions is not met, at an operation block 212 the converter circuit continues normal operation and control is passed to the control operation block 204. Otherwise, if both conditions are met, the control is passed to the operation block 208.

Either one of the two conditions checked in the control operation blocks 204 and 206 can trigger the hiccup protection mechanism. One condition is the output current $I_{out}$ is higher than the maximum allowed current value $I_{max}$ checked by the control operation block 204. The other condition is that output voltage is lower than the regulation voltage and in the meantime the power command signal is at the preset low level, as checked by the control operation block 206, When the output voltage is not lower than the regulation voltage or the power command signal is not at the preset low level, the control is passed to the operation block 212, where normal operation of the circuit is continued.

When either condition triggers the hiccup mode, the controller, at an operation block 208 takes the following actions simultaneously 1) initiate the off period timer, 2) turns off the power stage and 3) forces a power command signal below a preset low level (e.g., using switch 130 of FIG. 1A). The power command signal can be the shared current signal ITH of a current-mode controller converter (e.g., 100A of FIG. 1A0, represent the current command, or the COMP signal for a voltage-mode controlled converter (discussed later) that represent the duty cycle, or a current sharing reference signal $V_{sh}$ that is shared among the phases (discussed later). The shared signal is an existing signal for every closed-loop controller, but does not use a dedicated communication bus for hiccup mode. The controller is reset to the initial state during the off-period (e.g., wait time) set in an operation block 210, and retries to start-up, after the off-period expires, by passing the control to the operation block 202.

The described arrangement controlled by the process 200 is a robust hiccup protection scheme that is independent of the current sharing performance, the matching of overcurrent limit between controllers, the phase number and controller number, the closed loop control bandwidth and the load condition. Once one of the phases detects an overcurrent event, all the phases are turned off simultaneously and the load is cooled down until the preset timer expires. The power dissipation during this period is approximately zero. After the hiccup timer expires, all the phases restart together. The subject scheme, as described above, provides a multi-controller to multi-controller duplex communication, without adding a dedicated bus, which reduces the cost and simplifies the implementation. The proposed concept is applicable in a number of architectures of a multiphase converter, as described with respect to the embodiments of FIGS. 3, 5, 6 and 7 herein.

Figure 3:
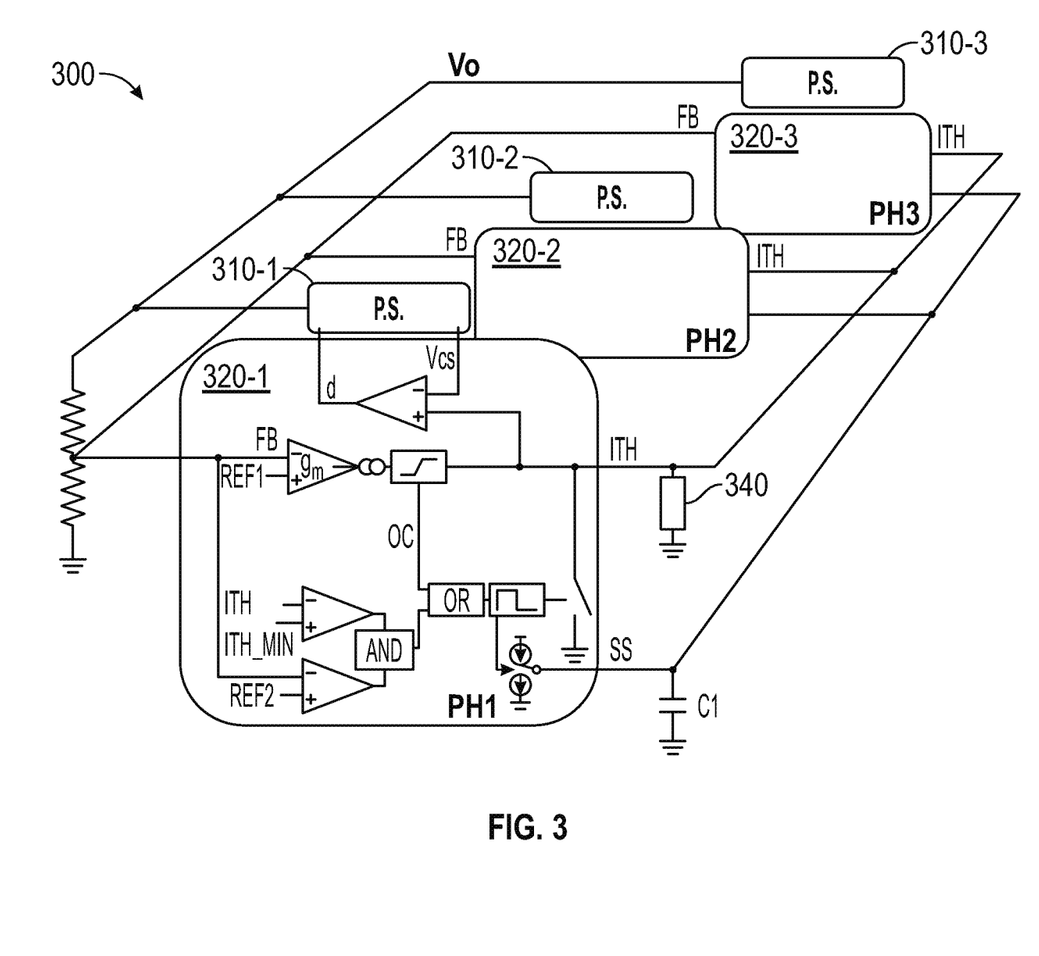
FIG. 3 is a schematic diagram illustrating an example multiphase switching converter synchronized using a threshold current (ITH) signal, according to aspects of the subject technology.

FIG. 3 is a schematic diagram illustrating an example multiphase switching converter 300 synchronized using a threshold current (ITH) signal, according to aspects of the subject technology. In the depicted example, the multiphase switching converter 300 is a masterless current-mode controlled multiphase converter. The multiphase switching converter 300 may include a number of phases, of which only three phases are shown in FIG. 3 for simplicity, but the number of phases is not limited to three. The multiphase switching converter 300 includes power stages 310 (e.g., 310-1, 310-2 and 310-3) and controllers 320 (e.g., 320-1, 320-2 and 320-3). The power stages 310 are similar to the power stages 110-1 and 110-2 of FIG. 1 described above. The controllers 320 have similar structures and functionality and share the shared current signal ITH (e.g., power command signal (PwrCmd) of FIG. 2), for which the respective nodes of the controllers 320 are commonly coupled to the compensation circuit 340, as described above with respect to FIG. 1A. Further, the timing capacitor C1 is shared between the controllers 320. The structure and operation of the controller 320-1 is similar to the control circuit 120-1 of FIG. 1A. Therefore, detailed description of operation of the controller 320-1 is not repeated herein to avoid unnecessary redundancy.

As described above, the controller 320-1 allows the multiple phases of the multiphase switching converter 300 to be synchronized. For example, the ITH signal path has a limiter (e.g., 126 of FIG. 1A), which clamps the maximum ITH and limits the maximum current via the closed current loop. Once the ITH is clamped, the overcurrent signal (OC) is asserted. After an optional waiting period, the controller 320-1 enters hiccup mode and pulls down the ITH to a low level. In practice, due to the inevitable clamping level mismatch, the ITH is always clamped by the phase with lowest clamping level among all the phases, while all other phases may not detect the OC condition. These phases with higher clamping level detect that the feedback (FB) voltage is below the reference (REF1) while the ITH is forced by the clamping phase(s) at the low level. This condition can also initiate the hiccup actions, just as the OC signal can. The power stage will be off until the hiccup mode timer expires.

Figure 4:
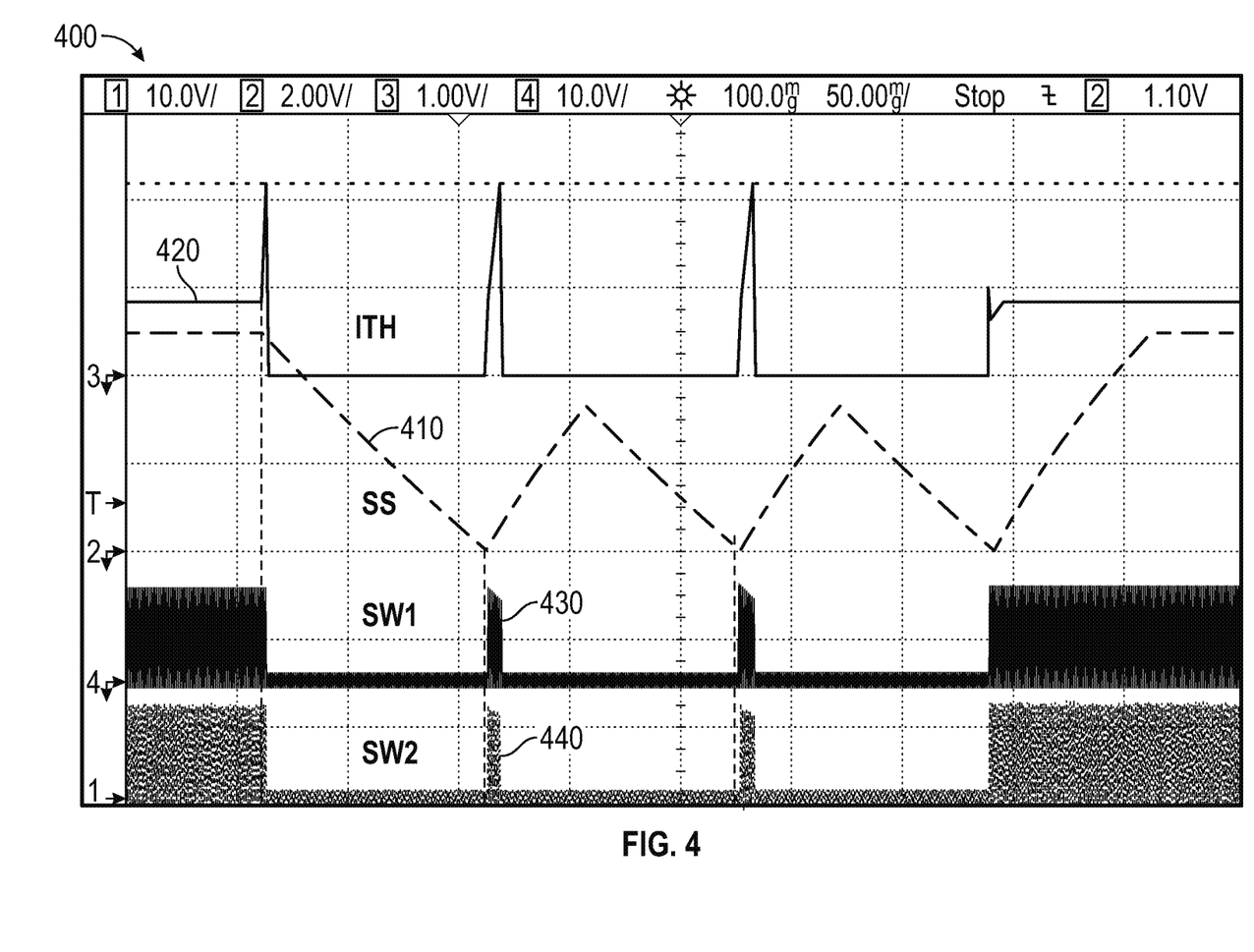
FIG. 4 is a timing diagram illustrating examples waveforms associated with a multiphase switching converter synchronized using an ITH signal, according to aspects of the subject technology.

FIG. 4 is a timing diagram 400 illustrating examples waveforms 410, 420, 430 and 440 associated with a multiphase switching converter synchronized using an ITH signal, according to aspects of the subject technology. The waveforms 410, 420, 430 and 440 of the timing diagram 400 correspond, for example, to the current-mode multiphase switching converter of FIG. 3. The waveform 410 depicts a waveform of the hiccup timer (e.g., 138 of FIG. 1). The waveform 420 depicts the shard current ITH, and the waveforms 430 and 440 correspond to switches (e.g., 130 of FIG. 1A).

Figure 5:
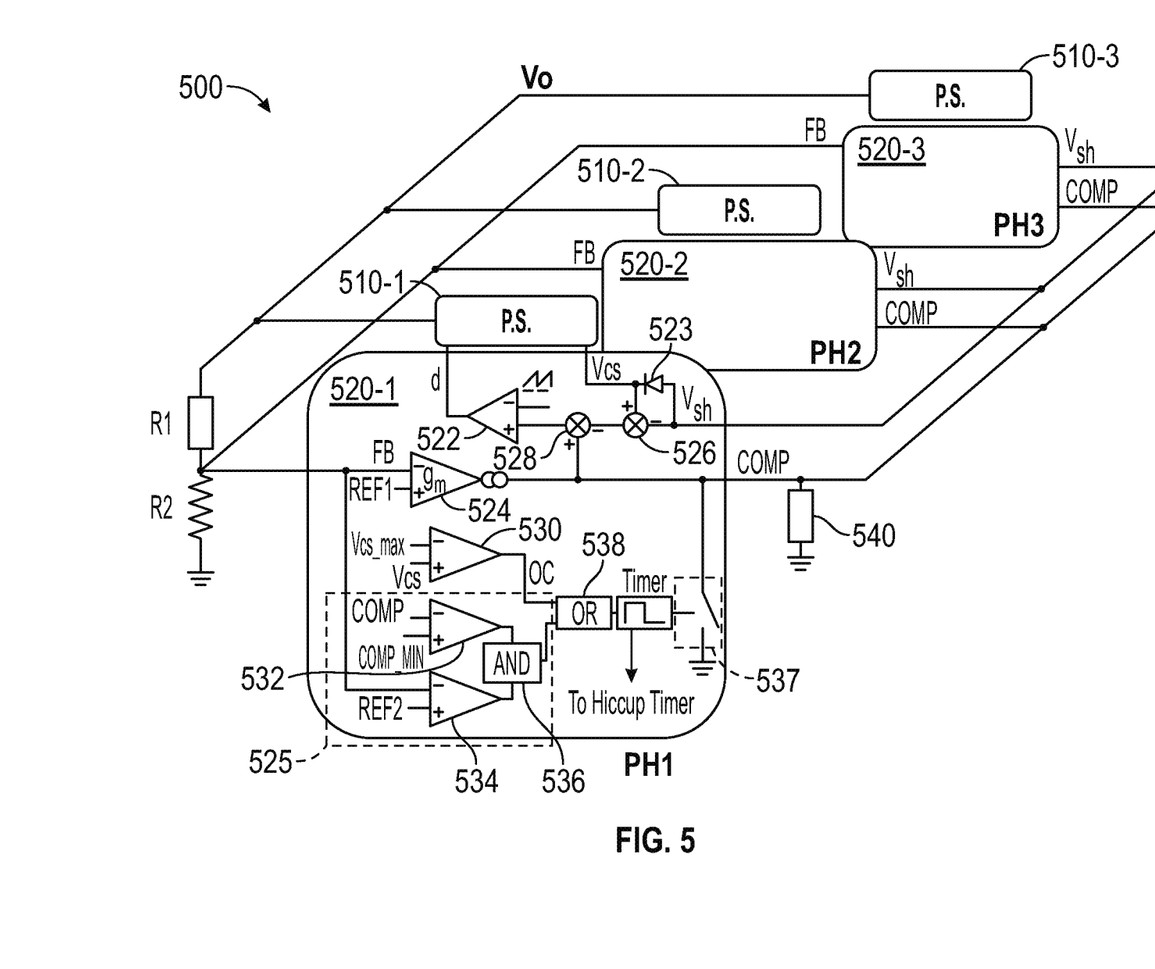
FIG. 5 is a schematic diagram illustrating an example multiphase switching converter synchronized using a COMP signal, according to aspects of the subject technology.

FIG. 5 is a schematic diagram illustrating an example multiphase switching converter 500 synchronized using a COMP signal, according to aspects of the subject technology. The multiphase switching converter 500 is a masterless voltage-mode controlled multiphase converter. The multiphase switching converter 500 may include a number of phases, of which only three phases are shown in FIG. 5 for simplicity, but the number of phases is not limited to three. The multiphase switching converter 500 includes power stages 510 (e.g., 510-1, 510-2 and 510-3) and controllers 520 (e.g., 520-1,520-2 and 520-3). The power stages 510 are similar to the power stages 110-1 of FIG. 1, and the controllers 520 are similar to the control circuit 120-1 described above, except for the synch circuit 525 and the shared power command signal (PwrCmd of FIG. 2) that in this embodiment is a COMP signal. The controllers 520 have similar structures and functionality and share the COMP signal and a current sharing reference signal $V_{sh}$ (hereinafter "shared voltage ($V_{sh}$) signal"), for which the respective nodes of the controllers 520 are coupled together. Further, output nodes of the error amplifiers (e.g., 524) of the controllers 520 are coupled together via a compensation circuit 540 to the ground potential.

The feedback signal (FB) sampled (via a voltage divider formed by resistors R1 and R2) from the output voltage Vo is connected to inverting input of the transconductance amplifiers (gm) (e.g., 524-1) of all the controllers. The outputs of the transconductance amplifiers COMP, from which the pulse-width modulation (PWM) duty ratio command signal is derived, are tied together. The COMP signal is compared with the modulation ramp at the PWM comparator 522 to generate the duty cycle pulse (d). The duty cycle pulse (d) can control a duty cycle of the power stage 110-1 of FIG. 1A.

For current balancing purposes, the current sensing signal Vcs from every power stage (P.S.) is connected to the current sharing bus via a or-ing diode 523. The Vsh will be automatically equal to the lowest or highest Vcs in all phases of the multiphase switching converter 500. In some other implementations, $V_{sh}$ can be automatically equal to the average value of Vcs of all the phases. The current sharing loop of each phase compares its own Vcs with $V_{sh}$ using the subtractor 526, and incrementally adjusts the actual COMP signal applied to the PWM comparator 522, in order to make the current of the first phase phase match with the lowest or highest current among all the phases.

The comparator 530 compares the current sensing signal Vcs with a maximum current limit Vcs_max. Once the current sensing signal Vcs is above Vcs_max, an overcurrent signal (OC) is asserted. After a preset time, the controller 520-1 pulls the COMP signal to a low level using the switch 537. Once the COMP is pulled down to the low level by one or more phases, the duty cycle of all the phases are set to approximately zero by the PWM comparator 522. Because the feedback voltage FB drops below REF2 (e.g., FB_MIN), while COMP is low, all phases of the multiphase switching converter 500 enter the hiccup mode and start the hiccup timer at the same time, without requiring a communication bus. As described with respect to FIG. 3, the hiccup mechanism can also be started by the synch circuit 525, which is similar to the synch circuit 325 of FIG. 3, except that the comparator 532 compares the COMP signal with a minimum (COMP_MIN) value, instead of comparing the ITH value, as did in FIG. 3. The operation of the comparator 534 and the logic AND gate 536 is similar to the comparator 134 and the logic AND gate 136 of FIG. 1.

Figure 6:
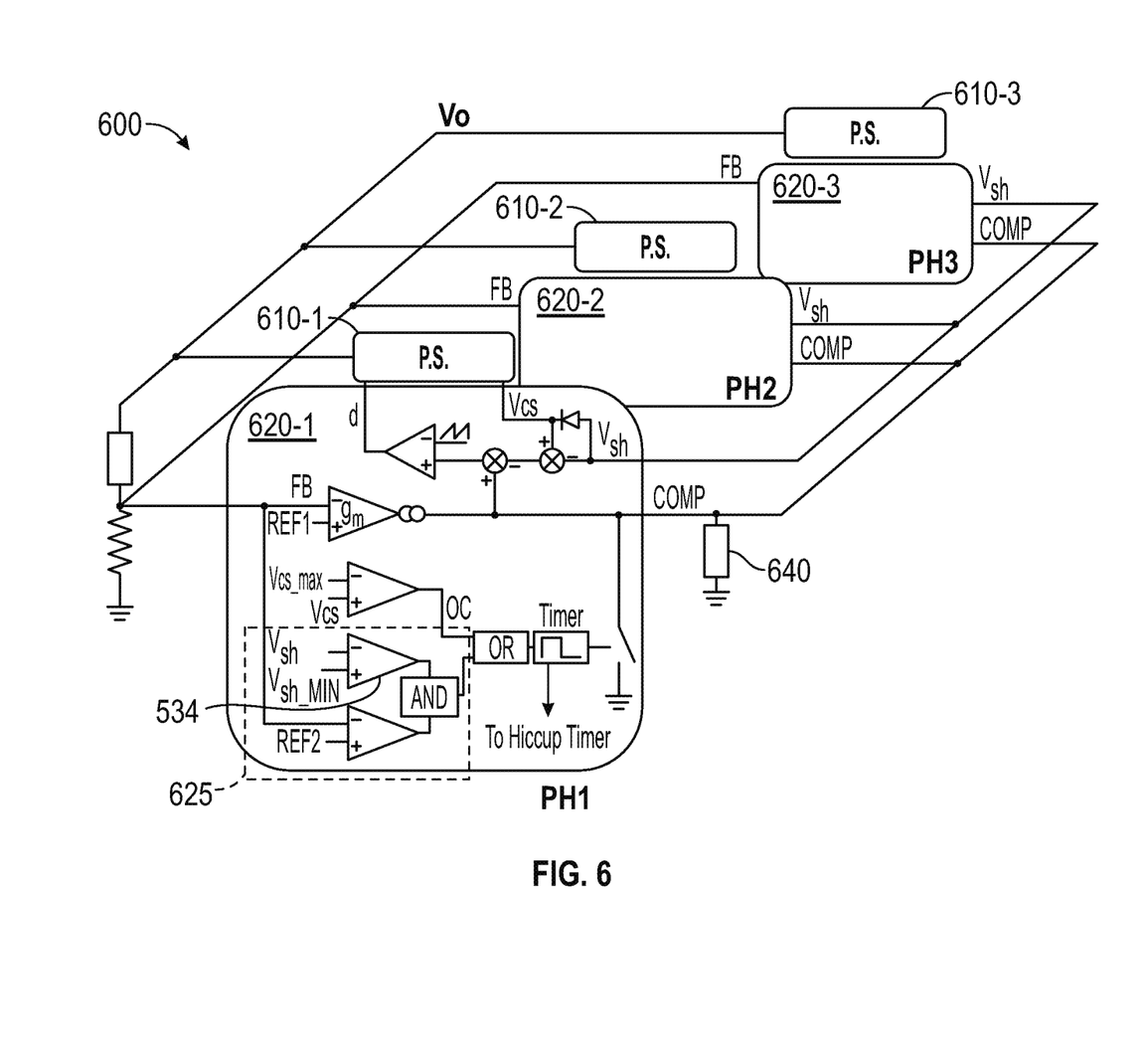
FIG. 6 is a schematic diagram illustrating an example multiphase switching converter synchronized using a shared voltage ($V_{sh}$) signal, according to aspects of the subject technology.

FIG. 6 is a schematic diagram illustrating an example multiphase switching converter 600 synchronized using a shared voltage ($V_{sh}$) signal, according to aspects of the subject technology. The multiphase switching converter 600 is a masterless voltage-mode controlled multiphase converter that is synched by the $V_{sh}$ signal. The multiphase switching converter 600 may include a number of phases, of which only three phases are shown in FIG. 6 for simplicity, but the number of phases is not limited to three. The multiphase switching converter 600 includes power stages 610 (e.g., 610-1, 610-2 and 610-3) and controllers 620 (e.g., 620-1, 620-2 and 620-3). The power stages 610 and the controllers 620 are similar to the power stages 510 and the controllers 520 of FIG. 5 described above, except for the synch circuit 625, which is different. In the synch circuit 625, the first comparator 534 compares the $V_{sh}$ signal with a $V_{sh\_MIN}$ value and when the $V_{sh}$ signal is less than the $V_{sh\_MIN}$ value and at the same time the feedback voltage FB is less than the reference voltage (REF2, e.g., FB_MIN)) an output of the AND gate is asserted high.

The controllers 620 have similar structures and functionality and share the COMP signal and the $V_{sh}$ signal, for which the respective nodes of the controllers 620 are coupled together. Further, output nodes of the error amplifiers of the controllers 620 are coupled together via a compensation circuit 640 to the ground potential.

The $V_{sh}$ signal automatically equals to the lowest or highest Vcs in all phases of the multiphase switching converter 600. Once a Vcs value pf one of the power stages 610 is above the maximum current limit (VC_max), an overcurrent signal (OC) is asserted in this phase and the controller pulls down the signal $V_{sh}$ to a low level. Once the signal $V_{sh}$ is pulled down to the low value by at least one phase, all other phases of the multiphase switching converter 600 see that signal $V_{sh}$ is low and the feedback voltage FB is low at the same time. According to the logic arrangement, all the phases of the multiphase switching converter 600 enter the hiccup mode and start the timer at the same time.

Figure 7:
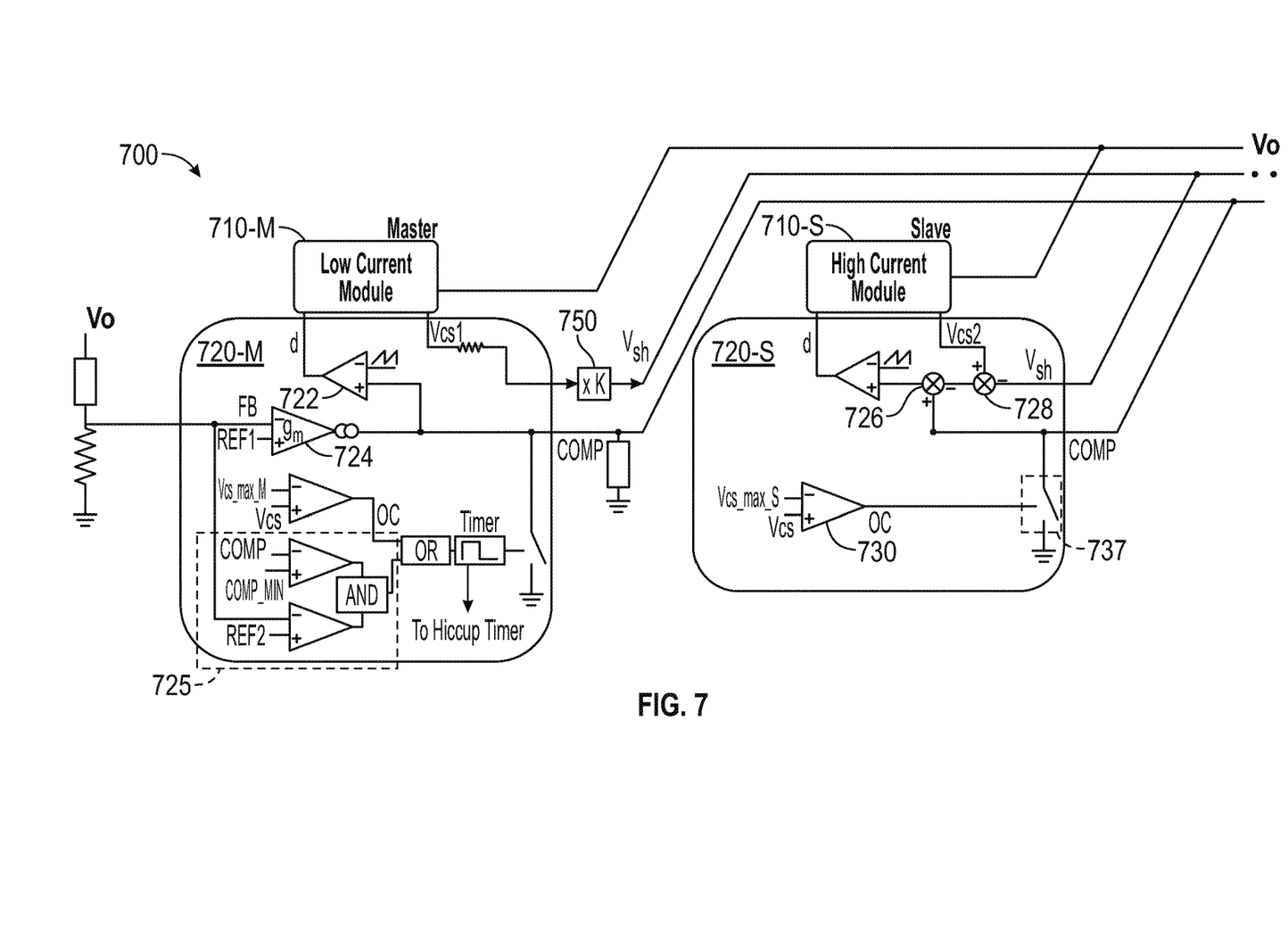
FIG. 7 is a schematic diagram illustrating an example master-slave multiphase switching converter synchronized using a shared voltage ($V_{sh}$) signal, according to aspects of the subject technology.

FIG. 7 is a schematic diagram illustrating an example master-slave multiphase switching converter 700 synchronized using a shared voltage (Vsh) signal, according to aspects of the subject technology. The master-slave multiphase switching converter 700 is a master-slave voltage-mode controlled multiphase converter. The master-slave architecture is a common way to lower down the solution cost and size. For example, a single master controller with voltage feedback loop and the power management interface, such as a power management bus (PMBus), can work with several simple slave controllers. The master-slave architecture has the flexibility that the current rating of the slave phases is not necessarily the same as the master phase. For example, the master phase may run at a significantly lower or higher current than the slave phase.

The master-slave multiphase switching converter 700 includes a master module and a number of slave modules. The master module includes a master power stage 710-M and a master controller 720-M. The slave module include a number of slave power stages such as a slave power stage 710-S, and a number of slave controllers 720 such as the slave controller 720-S. The master power stage 710-M is a low current module, whereas the slave power stages are high current modules. The master controller 720-M is similar to the controller 520-1 of FIG. 1. The slave controller 720-S is, however, simpler than the master controller 720-M. For example, the slave controller 720-S does not have a synch circuit 725, and a switch 737 of which is controlled by the OC signal. The switch 737 can be closed to pull down the COMP signal. The OC signal is generated by the comparator 730, which is similar to the comparator 530 of FIG. 5 described above.

The master-slave multiphase switching converter 700 constructs the communication from the slave phases to the master phase. The feedback signal FB sampled from the output voltage Vo is connected to an inverting input of the transconductance amplifiers (gm) (e.g., 724) of the master controller. The outputs of the transconductance amplifiers are the COMP signal, which define the PWM duty ratio command signal that is shared with the slave controllers. The COMP signal is compared with the modulation ramp at the PWM comparator 722 to generate the duty cycle pulse (d).

For current balancing purpose, the current sensing signal Vcs from the master phase is set as the current command $V_{sh}$ via an oval gain stage 750 with a gain equal to K. The current sharing loop of the slave phases compare its own Vcs with $V_{sh}$, and incrementally adjust its COMP signal applied to the PWM comparator, in order to make the current of the respective phase match the current of the master phase. Once the Vcs is above the maximum current limit Vcs_max, an overcurrent signal (OC) is asserted and the switch 737 of the controller 720-S pulls down the COMP signal to a low level. When the COMP signal is pulled down to the low value by any phase, the duty cycle of all the phases of the master-slave multiphase switching converter 700 are set to approximately zero. Because the feedback voltage FB drops below REF2 (e.g., FB_MTN) the COMP signal is low, the master controller 720-M enters the hiccup mode.

It is understood that the above disclosed embodiments can be extended to other switching power converters with active/passive switch current sensing or other inductor current sensing for different purposes.

Figure 8:
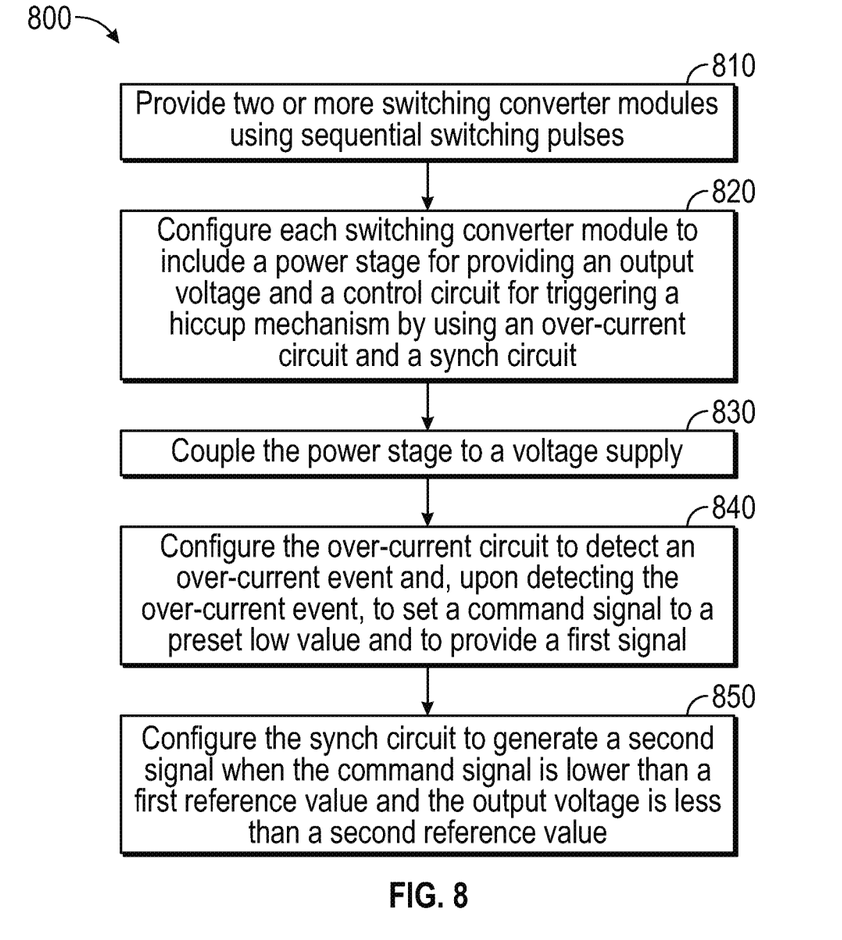
FIG. 8 is flow diagram illustrating a method of providing multiphase switching converter, according to aspects of the subject technology.

FIG. 8 is flow diagram illustrating an example method 800 of providing multiphase switching converter, according to aspects of the subject technology. For explanatory purposes, the method 800 is primarily described herein with reference to the switching converter 100A of FIG. 1A. However, the method 800 is not limited to the switching converter 100A, and one or more blocks (or operations) of the method 800 may be performed by one or more other components of the switching converter 1001. Further for explanatory purposes, the blocks of the example method 800 are described herein as occurring in serial, or linearly. However, multiple blocks of the example method 800 may occur in parallel. In addition, the blocks of the example method 800 need not be performed in the order shown and/or one or more of the blocks of the example method 800 need not be performed.

The method 800 includes providing two or more switching converter modules using sequential switching pulses (810). The method 800 further includes configuring each switching converter module to include a power stage (e.g., 110 of FIG. 1A) for providing an output voltage (e.g., Vout of FIG. 1A) and a control circuit (e.g., 120 of FIG. 1A) for triggering a hiccup mechanism by using an over-current circuit (e.g., 126 of FIG. 1A) and a synch circuit (e.g., 125 of FIG. 1A) (820). The power stage is coupled to a voltage supply (e.g., $V_{DC}$ of FIG. 1A). The over-current circuit is configured to detect an over-current event and, upon detecting the over-current event, to set a command signal (e.g., ITH of FIG. 1A) to a preset low value and to provide a first signal (e.g., OC signal of FIG. 1A) (840). The synch circuit can generate a second signal when the command signal is lower than a first reference threshold value (e.g., ITH_MIN of FIG. 1A) and the output voltage (e.g., a sample of Vout of FIG. 1A) is less than a second reference threshold value (e.g., REF2 of FIG. 1A) (850). The hiccup mechanism can be triggered by one of the first signal or the second signal. The hiccup mechanism includes controlling the power stage to stop providing power to a load during a programmable time period.

In some implementations, the method 800 further includes configuring the switching converter modules to operate in a current mode of operation. In the current mode of operation the over-current circuit can detect the overcurrent event by detecting that an output current of an error amplifier of the controller is higher than a preset value.

In one or more implementations, the command signal is a threshold current signal derived from an error amplifier of the control circuit, and the output nodes of over-current circuits of the switching converter modules are coupled via a compensation network to a ground potential.

In some implementations, the switching converter modules can operate in a voltage mode of operation. In the voltage mode of operation, the over-current circuit can detect the over-current event by detecting that a current sense voltage is greater than a preset voltage value.

In one or more implementations, the command signal is a comp voltage signal derived based on the output voltage or a signal controlling an inductor current such as ITH, and the output nodes of error amplifiers of the switching converter modules are coupled via a compensation network to a ground potential.

In one or more implementations, the command signal is a shared voltage signal derived based on a sensed current of an inductor of the power stage and is shared between the switching converter modules. Output nodes of error amplifiers can be coupled via a compensation network to a ground potential.

In summary, methods and circuits for overcurrent protection for multiphase switching converters is disclosed. The subject technology is robust to the current sharing performance, the matching of overcurrent limit between controllers, the phase number and/or the controller number, the closed loop bandwidth and the load condition. No communication bus for protection is needed.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration nay refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A controller for a multiphase switching converter that includes multiple power stages, the controller comprising:
   in a first power stage, an error amplifier configured to provide a threshold current signal based on a difference between a reference signal and an output signal of the converter;
   an over-current (OC) circuit configured to detect an OC event based on the threshold current signal and, in response to detecting the OC event, set a current command signal to a preset value, communicate the current command signal to the second power stage, and provide a first hiccup control signal for the first power stage;
   a synchronization circuit configured to disable the first power stage and a second power stage based on a magnitude of the threshold current signal and on a magnitude of the output signal of the converter; and
   a hiccup timer configured to receive the first hiccup control signal and to start a hiccup pulse in the first power stage in response to the first hiccup control signal.

2. The controller of claim 1, wherein the hiccup pulse is configured to disable at least one power stage of the multiphase switching converter.

3. The controller of claim 2, wherein the first power stage is configured to communicate the current command signal from the first power stage to one or more other power stages in the multiphase switching converter.

4. The controller of claim 2, wherein the current command signal is derived based on a sensed current of an inductor of the first power stage and is shared between stages of the multiphase switching converter.

5. The controller of claim 1, wherein in a current mode of operation the OC circuit is configured to detect the OC event by detecting that an output current command of the error amplifier is higher than a preset current value.

6. The controller of claim 1, wherein in a voltage mode of operation the OC circuit is configured to detect the OC event by detecting that a current sense voltage is greater than a preset voltage value.

7. A converter system with synchronized hiccup overcurrent protection, the system comprising:
   a DC voltage source configured to provide an unregulated DC voltage; and a multiphase switching converter circuit configured to convert the unregulated DC voltage to a regulated output voltage, wherein:

the multiphase switching converter comprises two or more switching converter modules configured to operate using multiphase sequential switching pulses, each switching converter module of the two or more switching converter modules comprising a power stage coupled to a DC voltage source and a control circuit including an over-current circuit and a synch circuit, the over-current circuit is configured to detect an over-current event and, upon detecting the over-current event, to set a current command signal to a preset low value and to provide a first signal, the synch circuit is configured to generate a second signal when the current command signal is lower than a first reference value and the regulated output voltage is less than a second reference value, a hiccup mechanism is triggered by one of the first signal or the second signal; and the current command signal comprises a threshold current signal derived from an error amplifier of the control circuit.

8. The system of claim 7, wherein the multiphase switching converter circuit is configured to operate in a voltage mode or the current mode, wherein in the voltage mode the over-current circuit is configured to detect the over-current event by detecting that a current sense voltage is greater than a preset voltage value.

9. The system of claim 8, wherein in the current mode of operation, the over-current circuit is configured to detect the over-current event by detecting that an output current of the error amplifier of the control circuit is higher than a preset current value.

10. A method for synchronizing hiccup over-current protection in a multiphase switching converter, the method comprising:

in a first power stage of multiple power stages of the multiphase switching converter:

deriving a threshold current signal based on a difference between a reference signal and a feedback signal, wherein the feedback signal includes information about an output of the converter;

detecting an over-current (OC) event based on the threshold current signal and, in response, communicating a current command signal to a second power stage and providing a first hiccup control signal for the first power stage;

selectively disabling the first power stage and the second power stage based on a magnitude of the threshold current signal and on a magnitude of the output of the converter; and triggering a hiccup pulse in the first power stage in response to the first hiccup control signal.

11. The method of claim 10, including communicating the threshold current signal to a second power stage of the multiphase switching converter; and operating the second power stage of the multiphase switching converter based on a second duty cycle signal that is derived from the threshold current signal.

12. The method of claim 11, wherein deriving the threshold current signal includes using an error amplifier in the first power stage to determine the difference between the reference signal and the feedback signal, and wherein communicating the threshold current signal includes coupling an output of the error amplifier in the first power stage with an output of an error amplifier in the second power stage.

13. The method of claim 10, wherein the detecting the overcurrent event includes, in a current regulation mode, comparing the threshold current signal with a current limit to provide a first comparison result.

14. The method of claim 10, further comprising:

in response to detecting the over-current event in the first power stage, communicating a current command signal to one or more other stages of the multiphase switching converter; and in a second power stage of the multiple power stages of the multiphase switching converter, receiving the current command signal and, in response, providing a second hiccup control signal to a second hiccup timer to start a second hiccup pulse in the second power stage.

15. The method of claim 14, further comprising setting the current command signal to a preset low value in response to:

the detected over-current event, or the current command signal having less than a specified minimum threshold current signal value, and the feedback signal having less than a specified minimum feedback signal value.

16. The method of claim 10, including coupling the threshold current signal to a ground reference when the first hiccup control signal is asserted.

17. The controller of claim 1, including a switch configured to couple the threshold current signal to ground in response to the first hiccup control signal.

18. The controller of claim 1, including a synchronization circuit configured to disable the first power stage and a second power stage in response to:

the threshold current signal exceeding a specified minimum value, and a representation of the output signal of the converter exceeding a specified reference value.

19. The controller of claim 18, wherein the specified minimum value is less than a limit used to detect the OC event and is greater than a ground reference.

20. The controller of claim 1, including, in the first power stage, a synchronization circuit comprising a first comparator, a second comparator, a logic AND gate, and the hiccup timer, wherein the first comparator is configured to determine a first relationship between the threshold current signal and a specified minimum threshold value, wherein the second comparator is configured to determine a second relationship between the output signal of the converter and a specified minimum voltage value, and wherein the logic AND gate is configured to provide the first hiccup control signal based on the first relationship and the second relationship.

* * * * *